United States Patent Office 3,751,495
Patented Aug. 7, 1973

3,751,495
PREVENTION OF DISCOLORATION IN
VINYLIDENE CHLORIDE
Dietmar Seyferth, Lexington, Mass., assignor to PPG
Industries, Inc., Pittsburgh, Pa.
No Drawing. Filed Aug. 8, 1969, Ser. No. 848,753
Int. Cl. C07c 21/00
U.S. Cl. 260—654 S                6 Claims

ABSTRACT OF THE DISCLOSURE

Discoloration of vinylidene chloride monomer due to dichloroacetylene is prevented by treatment with phosphines and esters of phosphoric or phosphorous acid.

BACKGROUND OF THE INVENTION

Vinylidene chloride is a well-known polymerizable monomer. Many uses for polymers of vinylidene chloride involve taking advantage of its water white clarity. For example, polyvinylidene chloride films are used as transparent wrapping materials, a usage where discoloration is detrimental. For the films to be free of discoloration, the vinylidene chloride monomer from which the polyvinylidene is formed must meet certain color-free standards.

Unfortunately, vinylidene chloride discolors upon standing, apparently as the consequence of the formation of undesirable color bodies. Such color degradation often is particularly noticeable when the vinylidene chloride is stored in the presence of mild steel, i.e., stored in typical steel drums used in shipping the monomer.

THE INVENTION

This invention involves treating vinylidene chloride monomer to provide a product which upon standing in storage does not discolor. It effects this by removing through chemical treament the cause of discoloration. Certain vinylidene chloride monomer discolors upon standing because it contains dichloroacetylene. It has now been discovered that this source of discoloration can be preferentially reacted with basic organic phosphorus compounds which are easily separated from the monomer.

This discoloration effect of dichloroacetylene on vinylidene chloride is evident from the following data in Table I:

TABLE I

| VDC sample | Monochloro-acetylene, p.p.m. | Dichloro-acetylene, p.p.m. | Color,[1] APHA |
|---|---|---|---|
| 1 | 5 | 5 | 20 |
| 2 | 5 | 8 | 18 |
| 3 | 19 | <5 | 18 |
| 4 | ND | 19 | 20 |
| 5 | ND | 25 | 16 |
| 6 | 15 | 28 | 20 |
| 7 | 12 | 37 | 20 |
| 8 | ND | 39 | 22 |
| 9 | ND | 47 | 27 |
| 10 | ND | 76 | 36 |
| 11 | ND | 102 | 55 |
| 12 | ND | 193 | 250 |
| 13 | | 793 | >500 |

[1] Color after storage at 50° C. in the presence of mild steel coupon for 300 hours with samples compared to platinum-cobalt color standards recorded on the APHA color scale.

NOTE.—VDC=Vinylidene chloride; ND=None detected.

As seen from the correlation between the dichloroacetylene content and the extent of color development in the vinylidene chloride, dichloroacetylene is responsible for discoloration.

Dichloroacetylene is not necessarily present in vinylidene chloride monomer. Rather, it is present only under special circumstances such as when the pyrolysis of a trichloroethane, a vinylidene chloride precursor, is conducted in the presence of a pyrolysis precursor for dichloroacetylene, e.g., trichloroethylene and/or tetrachloroethanes. Thus, when 1,1,2-trichloroethane (or 1,1,1-trichloroethane) containing minor amounts of trichloroethylene and/or tetrachloroethane is dehydrochlorinated by treatment with aqueous hydroxides such as aqueous potassium hydroxide, calcium hydroxide and aqueous sodium hydroxide, it is found that the resulting vinylidene chloride contains dichloroacetylene. Separation of dichloroacetylene from vinylidene chloride by fractional distillation is not practical because of the closeness in their boiling points. This contrast with monochloroacetylene (an acetylene which has been previously reported in vinylidene chloride) which unlike dichloroacetylene is readily removed by fractional distillation from vinylidene chloride, dichloroacetylene cannot.

In accordance with this invention, the dichloroacetylene content of the vinylidene chloride can be reduced or eliminated to provide vinylidene chloride which does not discolor disadvantageously by treating the dichloroacetylene contaminated vinylidene chloride with an organic derivative of phosphorous, notably a phosphine or ester of phosphorous or phosphoric acid.

These organic phosphates, it is found, react with the dichloroacetylene content of vinylidene chloride to form a reaction product from which vinylidene chloride can be separated by simple distillation. In this fashion, vinylidene chloride substantially free of dichloroacetylene is obtained. Such vinylidene chloride does not discolor.

Effective basic organic phosphorus compounds are many. Most suitable and readily available compounds are the esters of phosphoric and phosphorous acids. These esters may be mono-, di- or tri-alkyl, aryl or mixed alkyl-aryl esters of phosphoric or phosphorous acid, of which the tri-alkyl esters of phosphorous acid are preferred. Typical of these alkyl esters are tris-(2-ethyl hexyl) phosphate, triethyl phosphate, tributyl phosphate, tributyl phosphite, tri-n-octyl phosphate, di-n-butyl phosphate, trihexyl phosphate, trioctadecyl phosphate, di-n-octyl phosphate, tridecyl phosphate, tri-n-propyl phosphite, triethyl phosphite.

Aryl esters include compounds such as tricresyl phosphate, triphenyl phosphate, dicresyl phosphate, O-chlorophenyl diphenyl phosphate, diphenyl phosphate, bis-(p-t-butyl phenyl) phenyl phosphate, monocresyl phosphate, cresyl diphenyl phosphate, and the analogous phosphites.

Mixed alkyl-aryl esters are illustrated by diphenyl butyl phopshate, diphenyl 2-chloroethyl phosphate, didecyl phenyl phosphate, and 2-ethyl hexyl diphenyl phosphate.

The following examples illustrate the effective treatment of vinylidene chloride in accordance with this invention.

Example 1

Samples of vinylidene chloride containing dichloroacetylene were treated with varying amounts of triethyl phosphite at several different temperatures, to wit, at 32° C. while refluxing and in sealed bottles at 34° C. and 50° C. Periodically, the dichloroacetylene content of the treated material was determined by gas chromatography.

These results were obtained:

TABLE II

| Temperature, °C. | Triethylphosphite Weight percent | Triethylphosphite Mole/mole DCA | Dichloroacetylene (DCA), p.p.m. after 0 hr. | 2 hrs. | 4 hrs. | 5 hrs. |
|---|---|---|---|---|---|---|
| 32 | 0.42 | 6.6 | 366 | | | 41* |
| 32 | 0.64 | 7.2 | 477 | | | 101 |
| 32 | 0.96 | 2.9 | 158 | | | 6 |
| 34 | 0.54 | 3.9 | 711 | | 223 | |
| 50 | 0.23 | 3.1 | 421 | 266 | | 158 |
| 50 | 0.54 | 3.9 | 711 | | 36 | |

* Vinylidene chloride recovered by flash distillation from this treatment was tested in the presence of a mild steel coupon at 50° C. for 300 hours was found to have 19 APHA units, an acceptably low color quality.

Analysis of this distillate indicates the absence of phosphorous compounds.

Example 2

Five grams of tributyl phosphite were added to 483 grams of vinylidene chloride and the resulting mixture was refluxed under a nitrogen pad. Samples were periodically withdrawn and their dichloroacetylene content determined, as follows:

TABLE III

| Hours reacted: | Dichloroacetylene, p.p.m. |
|---|---|
| 0 | 158 |
| 2 | 51 |
| 3 | 26 |
| 4 | 43 |
| 5 | 13 |

As already indicated, other basic organic phosphorous compounds are effective. Most notable are the organic phosphines, notably the mono-, di- or trialkyl or mono-, di- or triphenyl phosphines such as tributyl phosphine, trioctyl phosphine, tricresyl phosphine, diphenyl butyl phosphite and the like.

Example 3 illustrates the effective use of a phosphine, triphenyl phosphine.

Example 3

Triphenyl phosphine was mixed with vinylidene chloride containing 477 p.p.m. dichloroacetylene in the proportion of one gram per 100 milliliters of vinylidene chloride and bottled after standing at room temperature for 60 hours, the vinylidene chloride was substantially free of dichloroacetylene.

Conditions for reaction between the organic phosphorus compound and dichloroacetylene are quite variable, with no extraordinary conditions of temperature or time being necessary. Simply adding the reagent phosphorus compound to the vinylidene chloride and allowing vinylidene chloride to stand at ambient temperature for several hours is effective.

It is generally desirable to reduce the dichloroacetylene content of vinylidene chloride to below about 40 parts per million to provide a product which does not, upon standing, develop undue discoloration. Accordingly, vinylidene chloride containing sufficient dichloroacetylene to cause an undesirable degree of discoloration, normally at least 40 parts per million dichloroacetylene is treated.

Dichloroacetylene concentrations in vinylidene chloride upwards of 40 parts per million as high as 800 parts per million or even more are apt to be encountered. Vinylidene chloride containing such dichloroacetylene concentrations is effectively treated.

While the invention has been described with reference to certain specific details, it is not intended that it be construed as limited to such details except and to the extent that such details are set forth in the claims.

I claim:

1. A method of preventing discoloration of vinylidene chloride containing dichloroacetylene by reducing the dichloroacetylene content of vinylidene chloride which comprises adding to such vinylidene chloride an organic basic phosphorus compound selected from the group consisting of alkyl, aryl and alkyl-aryl esters of phosphorous acid, analogous esters of phosphoric acid, and alkyl, aryl and alkyl-aryl phosphines, causing said phosphorus compound to react with the dichloroacetylene to form a reaction product and separating the vinylidene chloride from the reaction product by distillation.

2. The method of claim 1 wherein the vinylidene chloride initially contains upwards of 40 parts per million by weight dichloroacetylene.

3. The method of claim 1 wherein the compound is tributyl phosphite, triethyl phosphite or triphenyl phosphine.

4. A method of preventing discoloration of vinylidene chloride produced by the dehydrochlorination of a trichloroethane containing trichloroethylene or tetrachloroethane which comprises adding to such vinylidene chloride an organic basic phosphorus compound selected from the group consisting of alkyl, aryl and alkyl-aryl esters of phosphorous acid or phosphoric acid and alkyl, aryl alkyl-aryl phosphines, causing said organic phosphorus compound to react with the discoloring contaminant in the vinylidene chloride and separating the vinylidene chloride from the reaction product by distillation.

5. The method of claim 4 wherein dehydrochlorination of the trichloroethylene or tetrachloroethane occurs during dehydrochlorination of the trichloroethane.

6. The method of claim 4 wherein the compound is a trialkyl or triphenyl ester of phosphorous or phosphoric acid.

References Cited

UNITED STATES PATENTS

| 2,858,347 | 10/1958 | Hutchings | 260—654 |
| 3,420,749 | 1/1969 | Dehn | 260—652 |
| 3,595,928 | 7/1971 | Rideout et al. | 260—654 |

LEON ZITVER, Primary Examiner

A. SIEGEL, Assistant Examiner

U.S. Cl. X.R.

260—654 D